Dec. 27, 1960     H. A. TOULMIN, JR     2,965,922
APPARATUS FOR MAKING SPHERICAL PELLETS OF MAGNESIUM
Filed Sept. 26, 1957
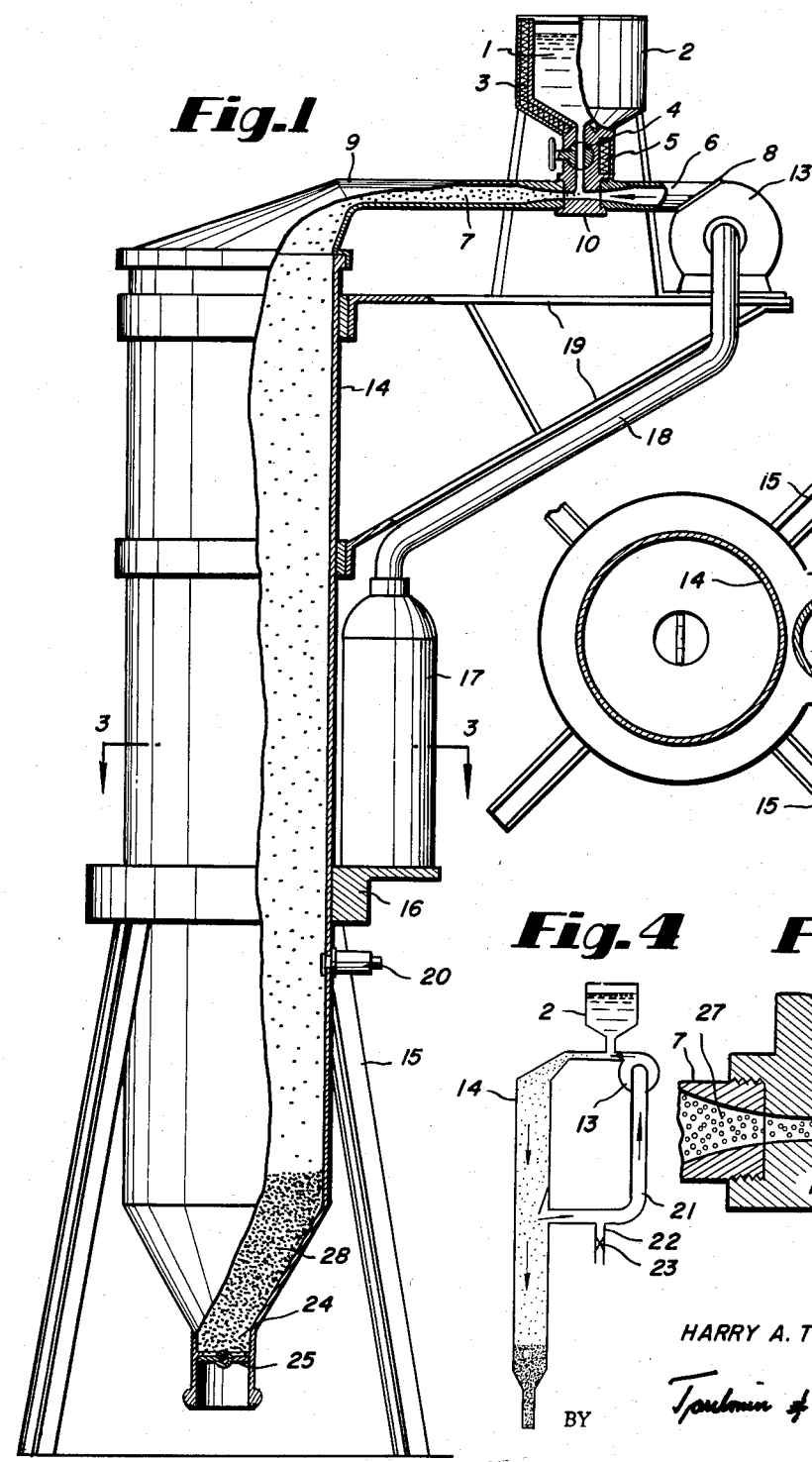
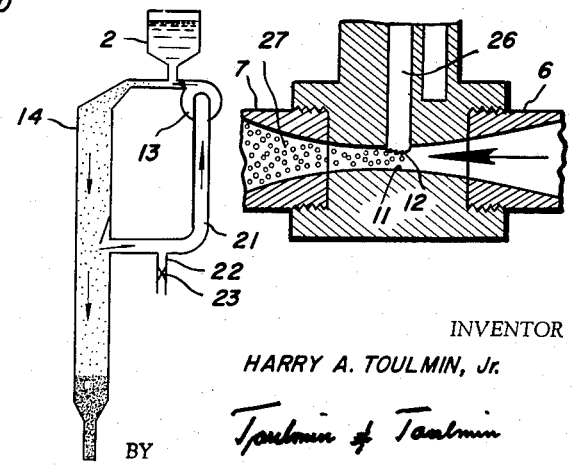
INVENTOR
HARRY A. TOULMIN, Jr.
BY Toulmin & Toulmin
ATTORNEYS

United States Patent Office 2,965,922
Patented Dec. 27, 1960

2,965,922

APPARATUS FOR MAKING SPHERICAL PELLETS OF MAGNESIUM

Harry A. Toulmin, Jr., Dayton, Ohio, assignor to The Commonwealth Engineering Company of Ohio Filed Sept. 26, 1957, Ser. No. 686,526

2 Claims. (Cl. 18—2.5)

The present invention relates to the production of magnesium pellets, more particularly to a method and apparatus for producing spherical magnesium pellets from molten magnesium.

In the previously known processes for the production of magnesium powder and magnesium particles, little attention, if any, has been paid to the shape of the particles. In certain applications and uses of magnesium particles, it is desired that the said particles be as nearly spherical as possible. Accordingly, the problem was to provide a suitable and effective method of producing spherical magnesium particles without entailing substantial expense or elaborate and complex equipment.

Previously, magnesium powder had been prepared by vaporizing magnesium and abruptly cooling the magnesium vapor by exposing the same to a neutral gas at a temperature of approximately 200° C. However, this process required such high temperatures for the vaporization of the magnesium that the equipment utilized was quite elaborate. Furthermore, there was no control over the shape of the particles obtained by this process.

The present invention is not only directed to the making of magnesium pellets of micron and submicron sizes, but also to making these particles spherical and with the use of a method and apparatus which is simple both in operation and in structure.

It is therefore the principal object of this invention to provide a novel and improved process and apparatus for the production of spherical magnesium pellets of micron and submicron sizes from molten magnesium.

It is another object of this invention to provide a quick and effective process simple in operation for the production of magnesium pellets.

It is a further object of this invention to provide an apparatus which can produce a large quantity of magnesium pellets in short periods of time.

Other objects and advantages of this invention will become apparent upon reference to the accompanying description taken in conjunction with the following drawings wherein:

Fig. 1 is a side elevational view of the apparatus of this invention with portions thereof cut away so as to show the details of construction;

Fig. 2 is a sectional view in an enlarged scale showing the structure connected with the source of molten magnesium for forming droplets of molten magnesium by a fast-moving stream of a neutral gas;

Fig. 3 is a sectional view taken across the lines 3—3 of Fig. 1; and

Fig. 4 is a schematic view of a modification of the apparatus illustrated in Fig. 1.

The process of this invention essentially comprises heating magnesium to its melting point so as to be in the molten form. The molten magnesium is then discharged into a fast-moving stream of a gas neutral to the magnesium. This fast-moving stream tears the molten magnesium into tiny droplets which are conveyed by the stream into an atmosphere of a neutral gas. Upon reaching this atmosphere, the droplets are passed through the atmosphere largely by the force of gravity, whereby the action of the gaseous atmosphere on the droplets forms the droplets into a substantially spherical shape. The droplets are then collected at the bottom of the chamber confining the atmosphere, where they are periodically removed.

A further modification of this invention provides for recirculation of the neutral gas from the chamber confining the gaseous atmosphere, to enable the recirculated gas to be brought into contact with the molten magnesium.

The apparatus for performing the process of this invention is illustrated in Fig. 1, wherein like reference symbols indicate the same parts throughout the various vews. In Fig. 1 the body of molten magnesium 1 is confined in a container 2 which has heating elements 3 to maintain the molten magnesium at a temperature of approximately 650° C., the melting point of magnesium. A discharge valve 4, also having heating elements 5, is connected to the bottom of the container 2. A horizontal conduit 6 forming a gas-stream passage 7 is positioned beneath the container 2 in a substantially horizontal position. The conduit 6 has an inlet end 8 and a discharge end 9. The conduit is connected to the discharge valve 4 by a T 10 within which is a venturi 11. The throat 12 of the venturi is connected with the valve in such a manner that the molten magnesium is discharged into the throat of the venturi. A high-powered fan or gas pump 13 is positioned to discharge into the inlet 10 of the conduit 6. The fan 13 is operated by a suitable source of energy such as an electric motor.

A cooling tower 14 has its upper end connected to the discharge end of the conduit 6. The tower 14 is in a vertical position and has a cross-sectional area which is substantially larger than that of the conduit 6. The tower is mounted in a supporting frame 15 and also has attached thereto a platform 16 upon which is positioned a source of gas such as a high-pressure cylinder 17. Cylinder 17 is connected to the inlet of the pump 13 by the line 18. A second frame 19 is attached to the upper end of the tower 14 and is used to support both the fan 13 and the magnesium container 2.

There is a discharge opening or vent 20 located in the side wall of the tower at an intermediate point between the top and bottom thereof.

Proceeding next to Fig. 4, there is illustrated a modification of the apparatus as shown in Fig. 1, wherein the gaseous medium is recirculated through the horizontal passage and the cooling tower. To accomplish this, a recirculation line 21 is connected between the discharge valve 20 on the tower and the inlet of the fan 13. A drain line 22 having a valve 23 is connected to the recirculation line 21.

In order to facilitate the removal of the magnesium pellets 14, the bottom of the tower is provided with an opening 24 having a closure 25 for removing the pellets therefrom.

With the apparatus of this invention in mind, the process will now be described. In order to provide a proper background for understanding this process, the element magnesium, which is undergoing the processing in this invention, will first be described in terms of its physical and chemical characteristics. Magnesium is a silvery, malleable, moderately hard metal which oxidizes and tarnishes in moist air but is stable in dry air. In its finely divided form, it is highly pyrophoric and burns with an intense white light. The solid form must be heated above its melting point before it will burn. Magnesium has a specific gravity of 1.69–1.75, has a melting point of 650° C. and a boiling point of 1120° C. It is soluble in acids and insoluble in water. Magnesium is characterized as being a reactive metal but behaves reasonably well in the atmosphere at ordinary temperatures. However, on exposure to the atmosphere, the surface will become gray, which indicates the formation of a partially protective film of oxide.

Commercial magnesium is 99.9% pure. The purity, however, can still be increased by distillation of the commercial magnesium in vacuum at relatively low temperatures.

To initiate the process, magnesium is first heated to a temperature of 650° C., which represents the melting point of the magnesium. The magnesium should not be heated more than a few degrees above this temperature, since at 670° C. nitrogen will be absorbed by the magnesium. A gas which is neutral to magnesium, such as nitrogen, is then propelled by the fan 13 into the horizontal gas passage 7. The gas is forced through the venturi 11 so that when it passes through the venturi, it has a speed of 500 to 1000 feet per second. This speed is dependent upon the capacity of the fan plus the action of the venturi. The nitrogen is maintained at a room temperature but may be heated to a temperature up to about 200° C. This latter temperature represents the maximum to which the nitrogen should be heated.

The molten magnesium is then poured through the discharge valve in a stream, as indicated at 26 in Fig. 2. As the stream 26 contacts the fast-moving stream of nitrogen, it is torn apart to form a multitude of tiny droplets of magnesium indicated at 27. The size of the droplets is largely dependent upon the force with which the fast-moving stream of gas hits the molten magnesium. Since it is desired that the pellets which are ultimately formed be of micron and submicron sizes, the force with which the molten magnesium is hit by the fast-moving stream of gas should be sufficient so as to form droplets of these minute sizes. The pellets are then conveyed by the stream of gas to the discharge end of the conduit into the open upper end of the cooling tower 14. Since the cross-section of the tower is considerably greater than the cross-section of the conduit, the speed of the gas will be greatly reduced to enable the droplets to pass through the chamber of the tower mostly under the action of gravity. As the droplets pass through this atmosphere of nitrogen, they will be formed into spherical pellets and be cooled. By the time the droplets reach the bottom of the tower, which is of the order of 50 ft. in height, the droplets will be in the form of solid spherical pellets of magnesium. The nitrogen within the tower is at a pressure of about 2 atmospheres.

The action of the droplets of magnesium as it passes through the tower is similar to the shot tower commonly employed in colonial days to make lead shot. With this tower, drops of lead were dropped through the air where they were formed into spheres and then plunged into water at the bottom of the tower where they were quickly cooled to form spherical shot.

The dropping of the droplets through the gaseous atmosphere under primarily the action of gravity similarly forms these droplets into spheres.

The droplets are collected at the bottom of the tank in a body as indicated at 28 and are periodically removed therefrom through the closure 25.

During the process the nitrogen may be withdrawn through the discharge valve 20 where it may be reprocessed and again packaged in cylinders for use in this process.

As pointed out above, the nitrogen may be circulated by passing the gas through the recirculation line 21 as illustrated in Fig. 4. In this event, the process is substantially a continuous one.

Thus it can be seen that the above-described invention discloses a simple and effective method of producing spherical magnesium pellets by dropping molten magnesium through an atmosphere of nitrogen maintained at above atmospheric pressure. The resulting pellets are in micron and submicron range of particles.

Although this invention has been described with specific reference to magnesium, pellets may be formed from numerous other materials in a like manner by modifying the conditions of the described process, such as the temperature to which the material is heated, the inert gas, the speed of the inert gas, the pressure within the vertical tower, and others.

It will be understood that this invention is susceptible to modification in order to adapt it to different usages and conditions, and, accordingly, it is desired to comprehend such modifications within this invention as may fall within the scope of the appended claims.

What is claimed is:

1. In an apparatus for the production of uniform spherical magnesium pellets, a source of molten magnesium, a substantially horizontal passage beneath said source of molten magnesium and having discharge and inlet ends, there being a venturi in said horizontal passage, means for discharging said molten magnesium in a stream into the throat of said venturi in the horizontal passage, means for producing a fast-moving stream of gas neutral to said magnesium at the inlet end of the passage through said venturi whereby the fast-moving stream of gas through said passage will tear apart the molten magnesium into droplets, and a vertically extending tower connected with the discharge end of said passage and being of substantially greater cross-section than said passage whereby the gas will circulate slowly through said tower and the droplets of molten magnesium will become hardened into pellets of magnesium, said tower being of sufficient height so that said droplets will become cooled as they freely fall therethrough.

2. In an apparatus for the production of uniform spherical magnesium pellets, a source of molten magnesium, a substantially horizontal passage beneath said source of molten magnesium and having discharge there being a venturi in said horizontal passage, and inlet ends, means for discharging said molten magnesium in a stream into the throat of said venturi in the horizontal passage, means for producing a fast-moving stream of gas neutral to said magnesium at the inlet end of the passage through said venturi whereby the fast-moving stream of gas through said passage will tear apart the molten magnesium into droplets, and vertically extending tower connected with the discharge end of said passage and being of substantially greater cross-section than said passage whereby the gas will circulate slowly through said tower and the droplets of molten magnesium will become hardened into pellets of magnesium, said tower being of sufficient height so that said droplets will become cooled as they freely fall therethrough, and means for collecting the gas from said tower at a point intermediate the top and bottom of the tower and recirculating the gas through the inlet of the horizontal passage.

References Cited in the file of this patent

UNITED STATES PATENTS

| 475,575 | Lawton et al. | May 24, 1892 |
| 1,655,222 | Elze | Jan. 3, 1928 |
| 2,402,441 | Paddle | June 18, 1946 |
| 2,460,993 | Brasse et al. | Feb. 8, 1949 |
| 2,630,623 | Chisholm et al. | Mar. 10, 1953 |
| 2,638,627 | Golwynne | May 19, 1953 |
| 2,676,359 | Chisholm | Apr. 27, 1954 |

FOREIGN PATENTS

| 551,425 | France | Jan. 8, 1923 |
| 460,898 | Germany | June 7, 1928 |